(12) United States Patent
Stupar et al.

(10) Patent No.: US 12,539,902 B2
(45) Date of Patent: *Feb. 3, 2026

(54) METHODS FOR LOCATING POINTS OR LINES OF INTEREST ON A RAILWAY TRACK, POSITIONING AND DRIVING AN INTERVENTION MACHINE ON A RAILWAY TRACK

(71) Applicant: MATISA MATERIEL INDUSTRIEL S.A., Crissier (CH)

(72) Inventors: Milan Stupar, Prilly (CH); Youcef Chinoune, Gex (FR)

(73) Assignee: MATISA MATERIEL INDUSTRIEL S.A., Crissier (CH)

( * ) Notice: Subject to any disclaimer, the term of this patent is extended or adjusted under 35 U.S.C. 154(b) by 1284 days.

This patent is subject to a terminal disclaimer.

(21) Appl. No.: 16/968,072

(22) PCT Filed: Jan. 31, 2019

(86) PCT No.: PCT/EP2019/052441
§ 371 (c)(1),
(2) Date: Aug. 6, 2020

(87) PCT Pub. No.: WO2019/154718
PCT Pub. Date: Aug. 15, 2019

(65) Prior Publication Data
US 2021/0016811 A1 Jan. 21, 2021

(30) Foreign Application Priority Data

| Feb. 6, 2018 | (FR) | 1850960 |
| Feb. 6, 2018 | (FR) | 1850961 |
| Feb. 6, 2018 | (FR) | 1850962 |

(51) Int. Cl.
*B61L 23/04* (2006.01)
*B61K 9/08* (2006.01)
(Continued)

(52) U.S. Cl.
CPC .............. *B61L 23/042* (2013.01); *B61K 9/08* (2013.01); *B61L 25/025* (2013.01); *G01B 11/24* (2013.01);
(Continued)

(58) Field of Classification Search
CPC ....... G06T 7/0004; G06T 7/001; G01B 11/24; B61K 9/08; B61L 15/009; B61L 15/0072;
(Continued)

(56) References Cited

U.S. PATENT DOCUMENTS

| 4,986,189 A | 1/1991 | Theurer |
| 9,049,433 B1 | 6/2015 | Prince |

(Continued)

FOREIGN PATENT DOCUMENTS

| EP | 0115462 | 8/1984 |
| EP | 3138753 | 3/2017 |

(Continued)

OTHER PUBLICATIONS

Masato Ukai Et Nobuhiko Nagahara. "A High-Performance Inspection and Maintenance System of Track using Continuous Scan Image" *11th World Congress on Railway Research (WCRR 2016)*; Milan, Italy; May 29-Jun. 2, 2016, Jan. 1, 2016 (Jan. 1, 2016). XP009508677.

(Continued)

*Primary Examiner* — Tracy Mangialaschi
(74) *Attorney, Agent, or Firm* — Ray Quinney & Nebeker P.C.; Paul N. Taylor

(57) ABSTRACT

In order to locate points or lines of interest A, B, C, D on a railway track 22, by means of a railway locating system 12
(Continued)

comprising a linear camera 26 and an odometer 28 progressing on the railway track 22 in a direction of progression 100, the odometer 28, repeatedly acquires instantaneous positioning data of the linear camera 26 with respect to the railway track 22 in the direction of progression 100, and the linear camera 26 pointing at the railway track 22 repeatedly acquires instantaneous linear optical data along an instantaneous measurement line 50. Then, by processing at least the instantaneous linear optical data and the instantaneous positioning data, a bitmap image is constructed of a zone of the surface of the railway track 22, and, in the bitmap image, at least one spatial indexing marker 56 of predetermined signature and its positioning relative to a reference rail 22A of the railway track 22 is identified. Points or lines of interest A, B, C, D are identified in the bitmap image, and the coordinates of the points or lines of interest are determined in a two-dimensional locating reference system O, x, y linked to the spatial indexing marker 56 and to the reference line 22A.

16 Claims, 2 Drawing Sheets

(51) Int. Cl.
*B61L 25/02*   (2006.01)
*G01B 11/24*   (2006.01)
*G06T 7/00*    (2017.01)
*B61L 15/00*   (2006.01)

(52) U.S. Cl.
CPC ............ *G06T 7/0004* (2013.01); *G06T 7/001* (2013.01); *B61L 15/0072* (2013.01); *B61L 15/009* (2013.01); *B61L 23/041* (2013.01); *B61L 2205/04* (2013.01)

(58) Field of Classification Search
CPC ...... B61L 23/04; B61L 23/042; B61L 23/041; B61L 25/025; B61L 2205/04
See application file for complete search history.

(56) References Cited

U.S. PATENT DOCUMENTS

| | | | |
|---|---|---|---|
| 2017/0066459 A1* | 3/2017 | Singh | G06F 18/2431 |
| 2017/0069090 A1* | 3/2017 | Okumura | G06F 18/00 |

FOREIGN PATENT DOCUMENTS

| | | | |
|---|---|---|---|
| FR | 2005890 A1 * | 12/1969 | |
| JP | 2006176071 A | 7/2006 | |
| JP | 2016133857 A | 7/2016 | |
| WO | 2017215777 A2 | 12/2017 | |

OTHER PUBLICATIONS

PCT/EP2019/052441, Apr. 15, 2019, English Translation of International Search Report and Written Opinion.

* cited by examiner

| 26 | Linear camera |
| 30 | Processing unit |
| 38 | Screen |
| 40 | HMI |

METHODS FOR LOCATING POINTS OR LINES OF INTEREST ON A RAILWAY TRACK, POSITIONING AND DRIVING AN INTERVENTION MACHINE ON A RAILWAY TRACK

TECHNICAL FIELD OF THE INVENTION

The invention relates to the use of a railway vehicle for auscultation of a railway track or for work on a railway track, notably for its construction, its upkeep, its maintenance, its repair, its renewal or its dismantling. It also relates to the early locating of points of interest on a railway track, delimiting if appropriate zones of interest for the later intervention of an intervention tool on the track, borne and maneuvered by a machine running on the track. It also relates to the transposition of such a locating for the later use thereof, notably for a later auscultation of the track by means of an auscultation apparatus or for later intervention on the track by means of an intervention tool.

PRIOR ART

The document U.S. Pat. No. 4,986,189 describes an intervention machine for the maintenance or the repair of a railway track, which comprises intervention tools intended to work while the machine advances while running on the railway track in a direction of progression of the works. To anticipate the presence of obstacles and to enable the automated command of the positioning of the tools, a measuring beam is arranged at the front of the machine. This measuring beam is arranged horizontally and perpendicularly to the direction of the track and comprises aligned sensors making it possible to detect the transversal positioning of the rail. Another sensor, constituted by a camera, monitors obstacles on the track. The measuring beam is further equipped with an odometer. The signals of the sensors are transmitted to a circuit for commanding tools with a delay which is a function of the signal of the odometer and the predetermined distance between the measuring beam and the tools. It is thus possible to arrange the measuring beam at a distance from the tools, without risk of interference therewith. But this operating mode presupposes that the predetermined distance between the measuring beam and the tools is known with precision. In so far as the desired precision for the positioning of the tools is centimetric, it is necessary to provide an extremely rigid common chassis to support the intervention tools and the measuring beam, in order to create a common reference system. It also presupposes that the perpendicularity of the measuring beam with respect to the track is precise. Furthermore, odometric errors linked for example to sliding or to the angular inscription of the feeler wheel with respect to the neutral line of the rail are cumulative. Finally, this system does not manage curved tracks.

The document *"A High-Performance Inspection and Maintenance System of Track using Continuous Scan Image"* by Masato Ukai and Nobuhiko Nagahara, 11th WCRR 2016, describes an early analysis system of a railway track with a view to a later intervention by means of a maintenance vehicle. This analysis system is mounted on a dedicated railway vehicle, which can circulate on the track at a maximum speed of 45 km/h. The analysis system makes use of a linear camera arranged on the vehicle across the track, coupled to an odometer, so as to synchronise the pulses of the odometer with linear shots by the linear camera. The system enables the construction of a continuous bitmap image (two-dimensional) of the railway track. The analysis of the bitmap image, which is not carried out in real time, makes it possible to detect objects having a predetermined signature, and notably obstacles, to determine zones of the track where an intervention is possible and "prohibited" zones where an automated intervention is not possible. To correct measurement errors of the odometer, notably in curves, it is proposed to regularly reset the signal of the odometer by recognising predetermined markers arranged on the track and of which the absolute position is known. The analysis system makes it possible to generate an intervention programme which may be carried out later by means of a maintenance machine-tool borne by a maintenance vehicle circulating on the railway track. But the later use of measurements by the maintenance vehicle necessitates the latter having available its own positioning means with respect to the track. Furthermore, potential perpendicularity defects between the linear camera and the track are not taken into account.

DESCRIPTION OF THE INVENTION

The invention notably aims to overcome the drawbacks of the prior art and to propose means enabling a precise early locating of points or lines of interest on a railway track, delimiting if appropriate the zones of interest for the later intervention of a tool borne and driven by an intervention machine running on the track.

For this purpose, according to a first aspect of the invention, a method for locating a railway track is proposed, carried out by a railway locating system comprising at least one linear camera pointing at the railway track and one or more odometers, the railway locating system progressing on the railway track in a direction of progression, the locating method comprising the following actions:

repeatedly acquiring, with the odometer(s), progression data of the railway locating system on the railway track in the direction of progression, repeatedly acquiring, with the linear camera pointing at the railway track, instantaneous linear optical data along an instantaneous measurement line, by processing at least the instantaneous linear optical data, and if appropriate the progression data, constructing a bitmap image of a zone of the surface of the railway track, by processing the constructed bitmap image, identifying, in the constructed bitmap image, at least one spatial indexing marker of predetermined signature, and by processing at least the progression data, determining a curvilinear abscissa of the spatial indexing marker and a positioning of the spatial indexing marker relative to a reference line of the railway track, and identifying points or lines of interest in the constructed bitmap image, and determining, in a two-dimensional locating reference system linked to the spatial indexing marker and to the reference line, the coordinates of the points or lines of interest.

The linear camera offers the advantage of being highly insensitive to parasitic movements, notably vibrations undergone by the locating system progressing on the railway track, which may be further accentuated if the locating system is fixed or hitched to an intervention machine on the railway track. Furthermore, the time of formation of a pixel of the linear image is shorter with respect to matrix technologies. The latency and the uncertainty of positioning which could be introduced by an extended exposure and a too long formation time are thus reduced.

By taking a spatial indexing marker and a reference line as local reference system to define the coordinates of the points or lines of interest, a data set is constructed which can be exploited later by a transposition system itself equipped to identify the spatial indexing marker and the reference line.

The linear optical data acquired at a given instant correspond to a line of the bitmap image. The construction of the bitmap image from linear optical data is simple because no problem of overlap is encountered between successive images which would be inherent to an acquisition by a matrix camera. The curves are also "naturally" rectified in the bitmap image constructed from the instantaneous linear data of the linear camera, which enables a simplified but nevertheless relevant representation for the operator.

According to an embodiment, the acquisition of the instantaneous linear optical data is triggered by the reception of progression data.

If the spatial resolution of the odometer is high, it is possible to trigger an acquisition line of linear optical data at each pulse of the odometer, or even all the N pulses, N being any non-zero whole number, which makes it possible to have a constant spatial step for successive acquisitions of the lines of linear optical data.

According to an embodiment, the instantaneous linear optical data and the progression data are acquired in a synchronised manner.

In particular, if the spatial resolution of the odometer is below the resolution desired for the construction of the bitmap image, it is possible for example to observe the time interval T between two successive pulses I−1 and I of the odometer, to divide this time interval by a predetermined non-zero whole number N, and to trigger acquisition lines of linear optical data at constant time interval T/N between the pulse I and the pulse I+1 of the odometer. The number of measurement lines is counted up to the pulse I+1, and a posteriori the spatial acquisition step of the linear optical data in the direction of progression between the pulses I and I+1 is deduced therefrom. In practice, the variations in speed of progression of the locating system are low at the observation scale, and the hypothesis of a constant speed between two successive pulses of the odometer leads to negligible deformation of the bitmap image. More generally, and whatever the algorithm retained, it is possible to trigger the linear camera for example by means of an electronic card for generating pulse trains or a dedicated software block.

According to an embodiment, the progression data and the instantaneous linear optical data are time stamped, the bitmap image preferably being constructed as a function of the time stampings. It is thus possible to determine a spatial step, potentially variable, between two successive lines of linear optical data, from knowledge of the spatial resolution of the odometer and the time intervals observed between two pulses of the odometer and between two measurement lines of the linear camera.

According to an embodiment, the points or lines of interest constitute the boundaries of a zone of interest, preferably the summits of a quadrilateral constituting a zone of interest. Preferably, the locating system is capable of identifying, in the bitmap image, intersections between track sleepers or neutral lines of track sleepers on the one hand and the rails of the railway track or the neutral rail lines on the other hand, these intersections constituting at least some of the points or lines of interest.

The coordinates of the points of interest may be Cartesian coordinates in a reference system taking for origin the spatial indexing marker, as X-axis the reference line and as Y-axis an axis perpendicular to the reference line. In this hypothesis, the coordinates comprise a distance with respect to the reference line measured perpendicularly to the reference line and a distance with respect to the spatial indexing marker measured parallel to the reference line.

The reference line may be determined locally by the datum of two points at least, or by the datum of a point and a steering vector, or by any other equivalent means. According to an embodiment, the reference line is a neutral line of one of the rails of the railway track, or a line constructed from the neutral lines of the rails of the railway track, for example a median line between the two rails of the railway track. In practice, it is possible to determine the neutral line of a rail for example by locating the edges of the rail on the bitmap image constructed from the instantaneous linear data. It is also possible to resort to an orientation matrix camera, as will be described hereafter.

Preferentially, an orientation device of the railway locating system repeatedly determines angular orientation data of the railway locating system with respect to the reference line, the coordinates of the points or lines of interest being determined as a function of the orientation data. Knowledge of the angle between the linear camera and the reference line, in a projection plane of the bitmap image, makes it possible to rectify the coordinates of the points of interest and the spatial indexing marker. Indeed, in the presence of a non-right angle between the linear camera and the reference line, the distance seen by the linear camera between a point of interest and the rail is greater than the actual distance measured perpendicularly to the reference line. Naturally, the distance between two adjacent pixels of the linear camera is known, and given by calibration parameters.

According to an embodiment, the orientation device of the locating system comprises at least one first feeler for detecting an orientation of the locating system with respect to a first rail of the railway track, constituting a first orientation rail, and preferably comprises a second feeler for detecting an orientation of the locating system with respect to a second rail of the railway track, constituting a second orientation rail.

According to another embodiment, the orientation device of the locating system comprises at least one first orientation matrix camera arranged facing a first of the rails of the railway track, constituting a first orientation rail, the orientation device taking shots with the first orientation matrix camera and processing the shots so as to detect therein an orientation of the first orientation rail with respect to a target of the first orientation matrix camera and preferably comprises a second orientation matrix camera arranged facing a second of the rails of the railway track, constituting a second orientation rail, the orientation device taking shots with the second orientation matrix camera and processing the shots so as to detect therein an orientation of the second orientation rail with respect to a target of the second orientation matrix camera. The shots of the linear orientation camera(s) may also make it possible to determine the reference line. Different options are open to bring closer and to reconcile the data coming from the linear camera and the orientation camera(s). According to a first method, it is possible to carry out a calibration of the railway locating system, in such a way as to characterise by calibration parameters the relative positioning of the linear camera and the orientation device constituted by the orientation camera(s). From these calibration data, it becomes possible to transpose to the bitmap image constructed from the instantaneous linear optical data the guiding line of the rail detected in the image of the orientation camera. This first method may be implemented without detecting the neutral line of the rail, or more generally the reference line, in the bitmap image constructed from the instantaneous linear optical data. Conversely, it is possible to only exploit the angular orientation data supplied by the orientation device, the reference line being calculated from only data of the bitmap image constructed from the instantaneous linear data.

If appropriate, corrections may be made by means of inertial measurements carried out at a mid-point of the beam or by means of optical speed measurement techniques (which imply the taking of close together matrix images with the orientation camera). These approaches may also be used to select a suitable image (with low specific rotational dynamic) to determine an average angle of inscription of the beam with respect to the rail.

It is possible, if appropriate, to mix a camera and a feeler, on the same rail or on two different rails. It is thus possible to carry out an interpolation between the orientation data delivered by the two orientation matrix cameras to estimate the orientation of the linear camera. The presence of at least one sensor (feeler or matrix camera) above each rail of the railway track also makes it possible to offset the absence of a rail on a section of the track, notably when the locating system progresses along a track apparatus, for example points. It is also possible to choose a specific rail orientation in curves, for example the rail situated inside the curve.

Preferably, the orientation data are time stamped.

According to an embodiment, the locating system differentiates the zones of the surface of the railway track comprising sleepers and inter-sleeper zones of the surface of the track, the orientation device only delivering the orientation data once for each of the inter-sleeper zones. The variations in orientation being small between two sleepers, it is thus best to limit the mass of data to process.

Preferably, the orientation data are used to determine the reference line.

To enable human intervention on the points of interest or zones of interest identified, it is possible to provide the reproduction of the bitmap image on a viewing screen of the locating system. Preferably, the visual identification on the viewing screen of the points or lines of interest is provided.

It is possible to provide a validation and/or an invalidation of some at least of the points or lines of interest or the zone of interest or a qualification of the zone of interest as possible intervention or prohibited zone, following an input on a human-machine input interface.

According to another aspect of the invention, the invention relates to a method for positioning carried out by a measuring assembly comprising a locating system and a transposition system, the locating system comprising a linear camera and an odometer, the transposition system comprising one or more transposition matrix cameras positioned at a distance and behind the linear camera of the locating system in a direction of progression, the method comprising:
a locating phase carried out by the locating system and implementing the locating method described previously; then a transposition phase carried out by the transposition system and comprising the following actions:
    acquiring, with the transposition matrix camera(s), a set of one or more transposition matrix images in a spatial reference system of the transposition system;
    as a function of the progression data acquired by the odometer, identifying, in the set of one or more transposition matrix images, the spatial indexing marker and determining the coordinates of the spatial indexing marker and data characteristic of the reference line in the spatial reference system of the transposition system, and
    calculating the transposed coordinates of the points or lines of interest in the spatial reference system of the transposition system, as a function of the coordinates of the spatial indexing marker and data characteristic of the reference line in the spatial reference system of the transposition system, and the coordinates of the points or lines of interest in the locating reference system.

According to another aspect of the invention, the invention relates to a method for driving an intervention machine progressing on a railway track in a direction of progression and comprising an intervention tool mounted on an intervention chassis, by means of a measuring assembly comprising a locating system and a transposition system, the locating system comprising at least one linear camera and an odometer, the transposition system comprising at least one transposition matrix camera positioned at a distance and behind the linear camera of the locating system in the direction of progression, the transposition matrix camera being integral with the intervention chassis of the intervention tool, the method comprising: a positioning procedure such as described previously and an intervention procedure comprising the positioning of the intervention tool as a function of the coordinates of the points or lines of interest in the transposition reference system.

The intervention tool may be of any type, for example a tamping tool or ramming tool.

The method according to this aspect of the invention may comprise various embodiments reproducing the characteristics of all or part of the embodiments described in relation with the first aspect of the invention.

According to another aspect of the invention, the invention relates to a railway vehicle comprising a locating system comprising a linear camera and an odometer, the locating system being capable of carrying out one of the methods described previously, in one or the other of the alternatives thereof.

According to another aspect of the invention, the invention relates to a method for locating a railway track, carried out by a railway locating system progressing on the railway track in a direction of progression, the locating method comprising the following actions:
    repeatedly acquiring, with a linear camera of the railway locating system pointing at the railway track, instantaneous linear optical data, along an instantaneous measurement line,
    repeatedly acquiring, with an orientation device of the railway locating system, orientation data of the railway locating system with respect to a reference line of the railway track,
    by processing at least the instantaneous linear optical data, constructing a potentially distorted bitmap image of a zone of the surface of the railway track,
    identifying points or lines of interest in the potentially distorted bitmap image, and
    determining the rectified coordinates of the points or lines of interest, as a function of potentially distorted coordinates of the points or lines of interest in a reference system of the potentially distorted bitmap image and the orientation data.

The linear camera offers the advantage of being highly insensitive to vibrations undergone by the locating system progressing on the railway track, which may be further accentuated if the locating system is fixed or hitched to an intervention machine on the railway track.

The instantaneous linear optical data acquired at a given instant correspond to a line of the bitmap image. The instantaneous measurement line is displaced, with respect to the railway track, as the locating system progresses.

Knowledge of the angle between the linear camera and the reference line, in a projection plane of the bitmap image, makes it possible to rectify the coordinates of the points of interest and the spatial indexing marker. Indeed, in the presence of a non-right angle between the linear camera and the reference line, the distance seen by the linear camera between a point of interest and the rail is greater than the actual distance measured perpendicularly to the reference line.

According to an embodiment, it is provided that to acquire the orientation data, a first feeler of the orientation device detects an orientation of the locating system with respect to a first rail of the railway track, constituting a first orientation rail, and, preferably, a second feeler of the orientation device detects an orientation of the locating system with respect to a second rail of the railway track, constituting a second orientation rail.

According to another embodiment, it is provided that to acquire the orientation data, a first orientation matrix camera of the orientation device, arranged facing a first of the rails of the railway track constituting a first orientation rail, takes shots processed by the orientation device to detect therein an orientation of the first orientation rail with respect to a target of the first orientation matrix camera, and, preferably a second orientation matrix camera arranged facing a second of the rails of the railway track, constituting a second orientation rail, takes shots and processing the shots, processed by the orientation device to detect therein an orientation of the second orientation rail with respect to a target of the second orientation matrix camera.

It is possible, if appropriate, to mix a camera and a feeler, on the same rail or on two different rails. It is thus possible to carry out an interpolation between the orientation data delivered by the two orientation matrix cameras to estimate the orientation of the linear camera. The presence of at least one sensor (feeler or matrix camera) above each rail of the railway track also makes it possible to offset the absence of a rail on a section of the track, notably when the locating system progresses along a track apparatus, for example points. It is also possible to choose a specific rail orientation in the curves, for example the rail situated inside the curve.

Preferably, the orientation data are time stamped.

According to an embodiment, the locating system detects zones of the surface of the railway track comprising sleepers and inter-sleeper zones of the surface of the track, the orientation device only delivering the orientation data once for each of the inter-sleeper zones. The variations in orientation being small between two sleepers, it is thus best to limit the mass of data to process.

Preferably, the reference line is a neutral line of one of the rails of the railway track, or a line constructed from the neutral lines of the rails of the railway track. Preferably, the orientation data is used to construct the reference line from the neutral lines of the rails of the railway track.

According to a particularly advantageous embodiment, one or more odometers of the railway locating system repeatedly acquire progression data of the railway locating system on the railway track in the direction of progression.

According to a first implementation of this embodiment, the acquisition of the instantaneous linear optical data is triggered by the reception of progression data.

If the spatial resolution of the odometer is high, it is possible to trigger a line of acquisition of linear optical data at each pulse of the odometer, or even all the N pulses, N being any non-zero whole number, which makes it possible to have a constant spatial step for successive acquisitions of the lines of linear optical data.

According to a second implementation of this embodiment, the instantaneous linear optical data and the progression data are acquired in a synchronised manner.

In particular, if the spatial resolution of the odometer is less than the desired resolution for the construction of the bitmap image, it is possible to observe the time interval T between two successive pulses I−1 and I of the odometer, to divide this time interval by a predetermined non-zero whole number N, and to trigger the lines of acquisitions of linear optical data at a constant time interval T/N between the pulse I and the pulse I+1 of the odometer. The number of lines of measurements up to the pulse I+1 is counted, and a posteriori the spatial acquisition step of the linear optical data in the direction of progression between the pulses I and I+1 is deduced therefrom. In practice, the variations in speed of progression of the locating system are small at the observation scale, and the hypothesis of a constant speed between two successive pulses of the odometer leads to negligible deformation of the bitmap image.

According to an embodiment, the progression data and the instantaneous linear optical data are time stamped, the bitmap image being preferably constructed as a function of the time stampings. It is thus possible to determine a spatial step, potentially variable, between two successive lines of linear optical data, from knowledge of the spatial resolution of the odometer and the time intervals observed between two pulses of the odometer and between two measurement lines of the linear camera.

According to a particularly advantageous embodiment, the locating method is such that:
  by processing the potentially distorted bitmap image, at least one spatial indexing marker of predetermined signature is identified in the potentially distorted bitmap image,
  by processing the progression data and the orientation data, a curvilinear abscissa of the spatial indexing marker and a positioning of the spatial indexing marker relative to the reference line of the railway track are determined, and
  the rectified coordinates of the points or lines of interest are determined in a local two-dimensional locating reference system linked to the spatial indexing marker and to the reference line.

By taking a spatial indexing marker and the reference line as local reference system to define the coordinates of the points or lines of interest, a data set is constructed which can be exploited later by a transposition system itself equipped to identify the spatial indexing marker and the reference line.

According to an embodiment, the points or lines of interest constitute the boundaries of a zone of interest, preferably the summits of a quadrilateral constituting a zone of interest. Preferably, the locating system is capable of identifying, in the bitmap image, intersections between track sleepers or neutral lines of track sleepers on the one hand and the rails of the railway track or the neutral lines of rails on the other hand, these intersections constituting at least some of the points or lines of interest.

The coordinates of the points of interest may be Cartesian coordinates in a reference system taking for origin the spatial indexing marker, as X-axis the reference line and as Y-axis an axis perpendicular to the reference line. In this hypothesis, the coordinates comprise a distance with respect to the reference line measured perpendicularly to the reference line and a distance with respect to the spatial indexing marker measured parallel to the reference line.

To enable human intervention on the identified points of interest or the zones of interest, it is possible to provide the reproduction of the bitmap image on a viewing screen of the locating system. Preferably, the visual identification on the viewing screen of the points or lines of interest is provided.

It is possible to provide a validation and/or an invalidation of some at least of the points or lines of interest or the zone of interest or a qualification of the zone of interest as possible intervention or prohibited zone, following an input on a human-machine input interface According to another aspect of the invention, the invention relates to a railway vehicle comprising a locating system comprising a linear camera, at least one matrix camera and, preferably, an odometer, the locating system being capable of executing one of the methods described previously, in one or the other of the alternatives thereof.

According to another aspect of the invention, the invention relates to a railway vehicle comprising a locating system comprising a linear camera and an odometer, as well as an orientation device, which may notably comprise a feeler or a matrix camera. This vehicle may be autonomous or may be hitched to an intervention vehicle supporting an intervention tool or an auscultation unit of the track.

According to another aspect of the invention, the invention relates to a railway vehicle, equipped with a locating system positioned in a first part of the vehicle, and a transposition system positioned in a second part of the vehicle situated at a distance and behind the first part in a direction of progression of the vehicle, the locating system comprising a linear camera and an odometer, as well as potentially an orientation device, which may notably comprise a feeler or a matrix camera, the transposition system comprising at least one transposition matrix camera.

According to a preferred embodiment, the railway vehicle is a machine for constructing or maintaining a railway track, which further comprises at least one tool for intervening on the railway track, arranged in a third part of the vehicle situated at a distance and behind the second part in the direction of progression.

The invention also aims to propose means making it possible to determine the positioning of a set of one or more tools borne by a railway intervention vehicle, from data acquired previously, concerning notably the positioning of points or lines of interest in a locating reference system.

For this purpose, according to another aspect of the invention, a method for commanding a set of one or more tools mounted on a railway intervention vehicle progressing on a railway track in a direction of progression is proposed, carried out by a transposition system comprising a transposition chassis mounted on the railway intervention vehicle and one or more transposition matrix cameras fixed to the transposition chassis, the method comprising the following actions:
  reception of data characterising a curvilinear abscissa of a spatial indexing marker of known signature, and positioning of the spatial indexing marker with respect to a reference line of the railway track, and coordinates of points or lines of interest in a two-dimensional locating reference system linked to the spatial indexing marker and to the reference line,
  acquisition with the transposition matrix camera(s) of a set of one or more transposition matrix images in a spatial reference system of the transposition system, fixed with respect to the transposition chassis;
  acquisition with an odometer of progression data of the transposition system with respect to the railway track,
  identification of the spatial indexing marker in the set of one or more transposition matrix images as a function of the progression data and the curvilinear abscissa data,
  determination of data characteristic of the spatial indexing marker and the reference line in the spatial reference system of the transposition chassis,
  calculation of transposed coordinates of the points or lines of interest in the spatial reference system of the transposition system, as a function of data characteristic of the spatial indexing marker and the reference line in the spatial reference system of the transposition system, and the coordinates of the points or lines of interest in the locating reference system.

The transposition chassis is preferably fixed with respect to a main chassis of the railway vehicle, and may if appropriate only form one with this main chassis. The railway vehicle is preferably provided with several undercarriages, which run on the railway track while supporting the main chassis.

The coordinates of the points of interest may be Cartesian coordinates in a reference system taking for origin the spatial indexing marker, as X-axis the reference line and as Y-axis an axis perpendicular to the reference line. In this hypothesis, the coordinates comprise a distance with respect to the reference line measured perpendicularly to the reference line and a distance with respect to the spatial indexing marker measured parallel to the reference line.

Preferably, the method further comprises an intervention procedure comprising the positioning of the set of one or more tools as a function of the coordinates of the points or lines of interest in the transposition reference system and positioning data of the set of one or more tools with respect to the transposition chassis.

The set of one or more tools may be of any type, for example a tamping tool, ramming tool or bolting tool.

According to an embodiment, the set of one or more tools is moveable with respect to the transposition chassis, the intervention procedure comprising an acquisition of positioning data of the set of one or more tools with respect to the transposition chassis by a position measuring device.

According to an embodiment particularly suited to an intervention tool, the intervention procedure comprises a command for displacing the set of one or more tools with respect to the transposition chassis.

According to an embodiment, the points or lines of interest constitute boundaries or characteristics of a zone of interest, preferably the summits or sides of a quadrilateral constituting the zone of interest. Preferably, the reception of coordinates of points or lines of interest in a two-dimensional locating reference system linked to the spatial indexing marker and to the reference line, comprises the reception of data for qualifying the zone of interest as possible intervention zone or prohibited zone, the positioning of the set of one or more tools being carried out uniquely if the zone of interest is a possible intervention zone.

According to an embodiment, the reference line is a neutral line of one of the rails of the railway track, or a line constructed from the neutral lines of the rails of the railway track.

According to an embodiment, the determination of data characteristic of the spatial indexing marker and the reference line comprises an orientation device of the transposition system repeatedly determining angular orientation data of the railway locating system with respect to the reference line.

It is notably possible to provide that the orientation device of the locating system comprises at least one first feeler for detecting an orientation of the locating system with respect to a first rail of the railway track, constituting a first orientation rail, and preferably comprises a second feeler for detecting an orientation of the locating system with respect to a second rail of the railway track, constituting a second orientation rail.

It is also possible to provide that the orientation device of the transposition system comprises at least one first orientation matrix camera arranged facing a first of the rails of the railway track, constituting a first orientation rail. The first orientation matrix camera is preferably constituted by a first transposition camera among the transposition camera(s). The orientation device takes shots with the first orientation matrix camera and processes the shots so as to detect therein an orientation of the first orientation rail with respect to a target of the first orientation matrix camera.

The orientation device of the transposition system preferably comprises a second orientation matrix camera arranged facing a second of the rails of the railway track, constituting a second orientation rail. The second orientation matrix camera is preferably constituted by a second transposition camera among the transposition camera(s). The orientation device takes shots with the second orientation matrix camera and processes the shots so as to detect therein an orientation of the second orientation rail with respect to a target of the second orientation matrix camera.

It is possible, if appropriate, to mix a camera and a feeler, on the same rail or on two different rails. It is thus possible to carry out an interpolation between the orientation data delivered by the two orientation matrix cameras to estimate the orientation of the transposition chassis. The presence of at least one sensor (feeler or matrix camera) above each rail of the railway track also makes it possible to offset the absence of a rail on a section of the track, notably when the transposition system progresses along a track apparatus, for example points. It is also possible to choose a specific rail orientation in curves, for example the rail situated inside the curve.

According to another aspect of the invention, the invention relates to an railway intervention vehicle comprising a set of one or more tools for intervening on a railway track, as well as a transposition system comprising a transposition chassis supported by the railway intervention vehicle and one or more transposition matrix cameras fixed to the transposition chassis.

The various aspects of the invention may naturally be combined, as well as the various embodiments.

BRIEF DESCRIPTION OF THE FIGURES

Other characteristics and advantages of the invention will become clear on reading the description that follows, with reference to the appended figures, which illustrate.

For greater clarity, identical or similar elements are marked by identical reference signs in all of the figures.

DETAILED DESCRIPTION OF EMBODIMENTS

Figure 1:
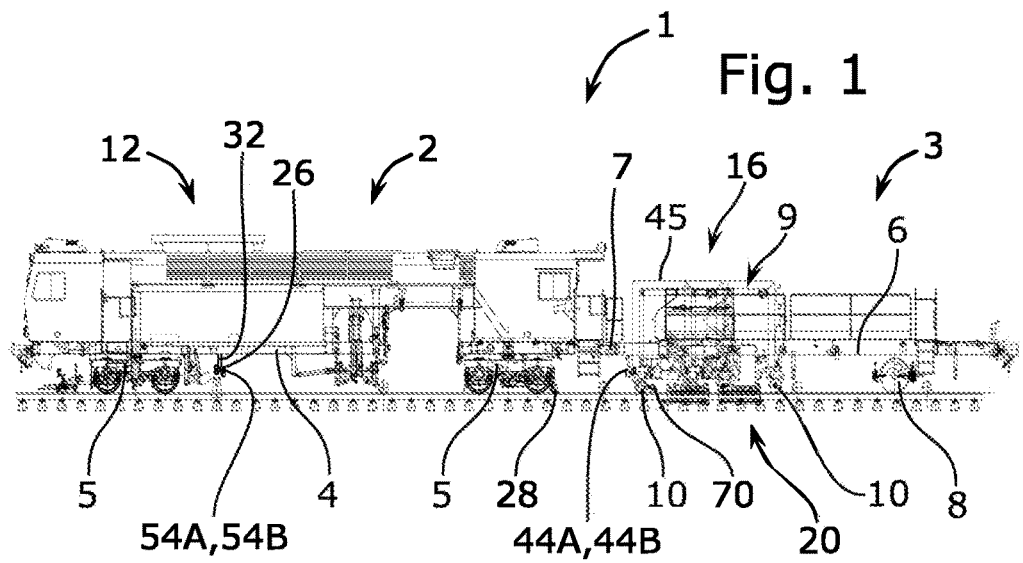
FIG. 1, a schematic side view of a railway intervention machine equipped with a locating system and a transposition system for the implementation of a method according to an embodiment of the invention.
Figure 2:
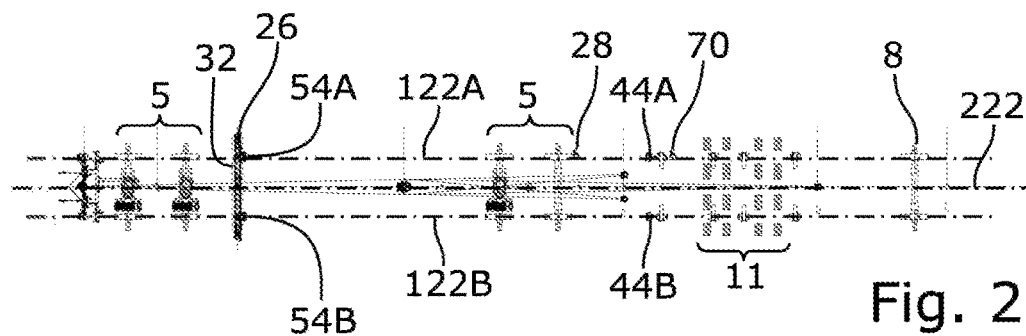
FIG. 2, a schematic top view of certain elements of the railway intervention machine of FIG. 1.

In FIGS. 1 and 2 is illustrated a railway intervention machine 1 composed of a first railway locating vehicle 2, here also having a function of traction and a second towed railway intervention vehicle 3. The railway locating vehicle 2 comprises a main chassis 4 supported by several undercarriages 5 spaced apart from each other in a longitudinal direction of the railway vehicle 2 whereas the railway intervention vehicle 3 is a semi-trailer of which the main chassis 6 is articulated by one end to a fastener 7 of the railway locating vehicle 2 and supported at the opposite end by an undercarriage 8. On the main chassis 6 of the railway intervention vehicle 3 is mounted a shuttle 9 which runs on the track through undercarriages 10, and supports a set of one or more intervention tools 11. A set of one or more actuators (not represented) makes it possible to displace the shuttle 9 with respect to the main chassis 6 parallel to a longitudinal direction of the main chassis 6. The railway intervention machine 1 is equipped with a locating system 12 positioned in the railway locating vehicle 2 and a transposition system 16 positioned on the shuttle 9 of the railway intervention vehicle 3, at a distance and behind the locating system, in a direction of progression 100 of the intervention machine 1, the set of one or more intervention tools 11 on the railway track 22 being arranged on the shuttle 9 of the railway intervention vehicle 3, at a distance and behind the transposition system 16 in the direction of progression 100.

The locating system 12 comprises a linear camera 26 and an odometer 28 connected to a processing unit 30. The linear camera 26 may be constituted if appropriate of several sensor units, aligned along a same measurement line. The linear camera 26 is mounted on a locating chassis 32 mounted under the main chassis 4 of the railway locating vehicle 2. The odometer 28 is mounted on one of the undercarriages 11.1.

Figure 3:
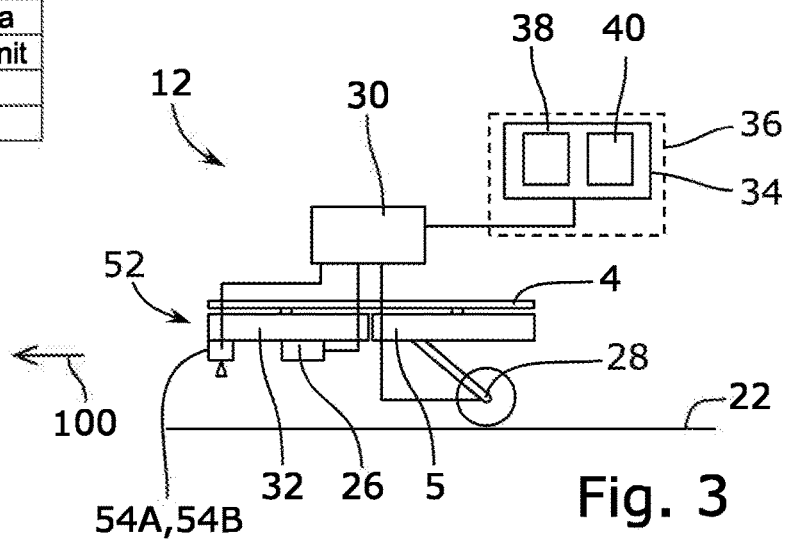
FIG. 3, a schematic view of the locating system of the vehicle of FIG. 1.

As illustrated in FIG. 3, the locating system 12 further comprises a human-machine interface 34 arranged in a control cabin 36 of the intervention machine 1. This human-machine interface 34 comprises a screen 38 and a human-machine input interface 40, which may be integrated in the screen if said screen is a touch screen, or constituted for example by a keyboard or a control lever.

Figure 4:
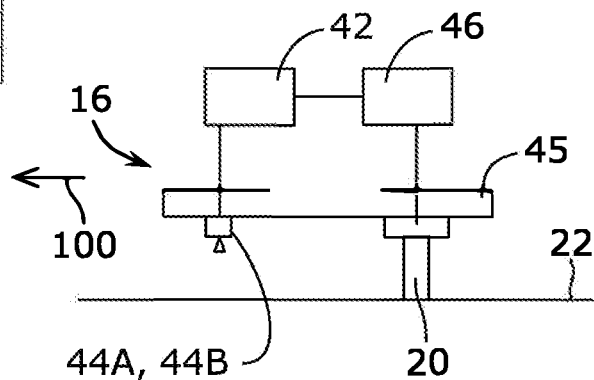
FIG. 4, a schematic view of the transposition system of the vehicle of FIG. 1.

The transposition system 16, schematically illustrated in FIG. 4, comprises a command unit 42, connected to at least one transposition matrix camera 44A and to a controller 46 for commanding the set of one or more tools 11. The transposition matrix camera 44A is here supported by the chassis 45 of the shuttle 9 of the railway intervention vehicle 3. If appropriate, the command units 42, 30 of the transposition system 16 and the locating system 12 may be combined in a same unit. The set of one or more tools 11 may be of any type, notably a tamping tool, ramming tool or bolting tool.

By construction, the rails of the railway track 22 locally define a reference plane, horizontal or inclined, according to the inclination of the track. In so far as the railway locating vehicle 2 runs on the railway track 22, it is considered that the chassis 4 of the locating device is parallel to this reference plane, which constitutes an acceptable approximation for the needs of the locating of the railway track 22 and the command of the set of one or more tools 11. The photosensitive cells of the linear camera 26 are directed along a direction perpendicular to the reference plane.

Figure 5:
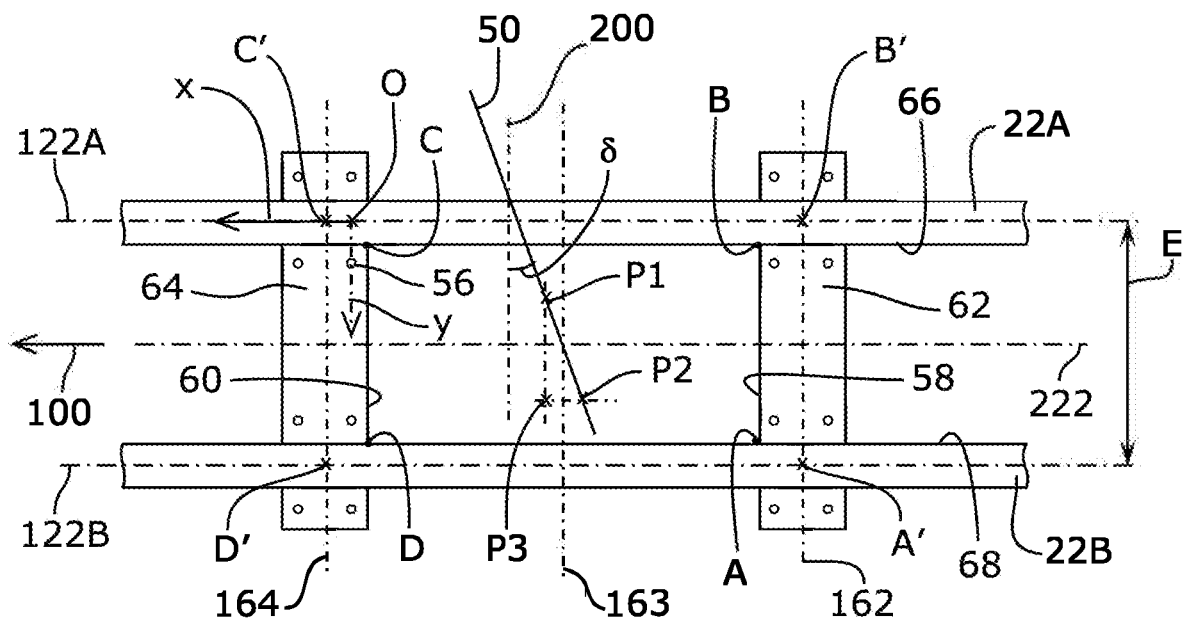
FIG. 5, a schematic view of a zone of railway track directly in line with the locating system of FIG. 3.

In the reference plane, and as illustrated in FIG. 5, the orientation of the measurement line 50 defined by the linear camera 26 is measured, in the reference plane of the track, by an angle δ with respect to the perpendicular 200 to a reference line 122A, which in this first embodiment is the neutral line of one of the rails 22A, 22B of the railway track 22 taken as reference rail 22A. This orientation is considered as unknown. It may vary as a function of the radius of curvature of the railway track 22, the positioning of the linear camera 26 with respect to the undercarriages of the railway locating vehicle 2, and as a function of the yaw of the railway locating vehicle 2 with respect to the railway track 22.

At each pulse of the odometer 28 the curvilinear abscissa of the locating system 12 along the reference line 122A is determined.

At a given instant, the linear camera 26 captures instantaneous linear optical data constituting a line of measurements, which covers the whole width of the railway track 22, including if appropriate the width of the sleepers. This input is repeated and successive measurement lines make it possible to construct a two-dimensional bitmap image having a step which is a function of the distance travelled between two measurements.

According to a first embodiment, the odometer 28 supplies a pulse each time that a known elementary distance is travelled in the direction of progression 100 of the railway locating vehicle 2 on the railway track 22, and these successive pulses are used to trigger the linear camera 26. The spatial interval between two successive lines of the bitmap image is then known and constant.

According to another embodiment, the linear camera 26 is triggered at time intervals determined by dividing the observed time interval between two successive pulses of the odometer 28. The time T elapsed between the pulses I–1 and I of the odometer is thus observed, this time T is divided by a predetermined non-zero whole number N, and, on the time interval separating the pulse I and the pulse I+1 of the odometer, the period T/N is used as time interval between two triggerings of the linear camera. A posteriori, the triggering is observed between the pulses I and I+1 of the odometer and the spatial step between two triggerings of the linear camera between the pulses I and I+1 is deduced therefrom. If it is estimated that the speed of progression varies little at this scale, the hypothesis may be made that the step is constant between two successive pulses. Other hypotheses may also be envisaged, by considering for example that the variation in speed (acceleration or deceleration) is constant between two pulses, and as a result a linearly variable spatial step between two pulses I and I+1.

According to another embodiment, the linear camera 26 is triggered at regular intervals, and the visual image data are time stamped. The pulses of the odometer 28 are also time stamped, in such a way that it is possible of determine by interpolation the path travelled between two successive lines of the bitmap image, which can vary.

According to an alternative of this latter embodiment, the linear camera 26 is triggered at intervals which are not necessarily regular, so as to densify the measurements in a zone of interest where enhanced precision proves to be useful, and to space them apart more in zones without interest, which enables optimisation of the volume of data.

The bitmap image resulting from successive inputs of the linear camera 26 is distorted, on account of the angle δ between the perpendicular to the reference line 122A and the linear camera 26. If, in the reference plane, a Cartesian reference system is considered of which the X-axis is parallel to the reference line 122A and the Y-axis perpendicular to the X-axis, it is observed that two points P1, P2 of the railway track 22 measured simultaneously by the linear camera 26 at a distance from each other, and which appear in the distorted bitmap image as having the same abscissa, have in fact, in the Cartesian reference system defined previously, different abscissa, the difference being proportional to the distance between the two points and to the sine of the angle δ. Furthermore, two points P1, P3 of the railway track 22 which have the same ordinate in the Cartesian reference system defined previously, appear distant from each other in the distorted bitmap image, their apparent distance being a function of the cosine of the angle δ.

It is possible to "rectify" the distorted image by estimating the angle δ.

A first estimation of the angle δ may be obtained by comparing, in a given measurement line of the linear camera, the distance measured between two known points of interest with a known spacing between these points. It is thus possible to evaluate in a given measurement line, the distance measured between two points situated one at the centre of the reference rail 22A and the other at the centre of the other rail 22B of the railway track 22. The ratio between the spacing of the rails E and the measured distance D is equal in absolute value to the cosine of the angle δ:

$$\frac{E}{D} = |\cos\delta|$$

But, apart from the fact that this estimation of the angle δ does not make it possible to determine the sign thereof, the precision of the estimation is low for small values of the angle δ, the derivative of the cosine function having a value close to zero. It also supposes that the actual spacing between the rails is constant and known with the desired precision.

A second estimation method may be implemented from the matrix images, by marking in the distorted bitmap image a predetermined object present on the track and of which the contour or certain dimensions are known, and by comparing the apparent contour or dimensions measured on the distorted bitmap image with the known contour or real dimensions. But, in practice, objects which could serve as comparisons do not exist on a railway track at sufficiently close intervals. In other words, using this method could lead to estimations of the angle δ too far apart from each other.

To estimate the angle δ, resort is preferably made to an orientation device 52 connected to the locating chassis 32.

According to an embodiment, the orientation device 52 comprises a feeler fixed to the locating chassis.

According to another embodiment, the orientation device 52 comprises at least one first orientation matrix camera 54A fixed to the locating chassis 32 and having a direction of view perpendicular to the reference plane of the railway track 22, facing one of the two rails 22A, 22B, for example the reference rail 22A. The orientation bitmap image, delivered by the orientation matrix camera, makes it possible, by image processing, to identify the direction of the reference line 122A, and to determine its orientation in the orientation bitmap image, which gives direct access to the orientation of the locating chassis 32 thus to the angle δ of the linear camera 26.

To limit the computational power necessary for the processing of the orientation image of the first orientation matrix camera 54A, it is possible to only carry out the measurements of the angle δ when it is necessary, notably when it is estimated or when it is determined that the angle δ is liable to have changed.

In practice, it turns out that the observed variations in the angle δ are small over an inter-sleeper space. It is thus advantageously possible to use the odometer 28 to trigger the first orientation matrix camera 54A each time that a predetermined distance has been travelled on the reference rail 22A, this distance preferably being equal to the inter-sleeper space. It is also possible to use the image processing operations carried out moreover on the distorted bitmap image delivered by the linear camera 26 and to trigger the shot by the first orientation matrix camera 54A each time that a new inter-sleeper space is detected on the distorted bitmap image.

It is also possible to choose to trigger the first orientation matrix camera 54A when it is determined, thanks to another measured datum, that it is probable that the angle δ has been modified. It is possible for example to use for this purpose an accelerometer positioned on the locating chassis 32. It is also possible to use the variations in the distance D mentioned above, measured between the rails 22A, 22B by the linear camera 26. It is also naturally possible to combine the triggering modes, for example by combining a systematic triggering by the odometer 28 and an additional triggering furthermore as a function of a measured or monitored datum.

The amplitude and the sine of the angle δ being known, it is possible to "rectify" the distorted bitmap image deduced from successive shots of the linear camera 26 and the measurements of distance travelled, delivered by the odometer 28.

It is also possible to limit this correction to several points of interest identified on the distorted image over a given inter-sleeper space. This is moreover the favoured solution for limiting the necessary computing power, in so far as the distortion observed on the distorted image does not prevent locating points of interest by processing the image, on the non-rectified distorted image.

In practice, and assuming that a measurement of the angle δ has been triggered beforehand, on the distorted bitmap image is located a spatial indexing marker of predetermined signature, for example a bolt centre 56 situated near to and on a predetermined side of the reference rail 22A, or any other predefined track component, for example a fastening element or a points core. This locating may notably be done by comparing the distorted bitmap image with various predetermined shapes of the predefined track component, distorted according to the angle δ, or by means of an artificial neural network or more generally an artificial intelligence unit having received prior learning, notably deep learning, for example by a pixel by pixel image segmentation technique (type SegNet), or by an object detection technique (type RFCN). Once this spatial indexing marker 56 has been identified, its apparent distance with respect to the reference line 122A is read on the distorted image and the actual distance between the spatial indexing marker 56 and the reference line 122A is calculated, measured perpendicularly to the reference line 122A, as a function of the angle δ. This then gives, with the spatial indexing marker 56 and the reference line 122A (assumed rectilinear at the scale of an inter-sleeper space), a local two-dimensional locating reference system for the inter-sleeper space considered. To get an idea, this reference system may have for origin the projection O of the spatial indexing marker on the reference line 122A, perpendicularly to the reference line 122A, for the X-axis the reference line 122A oriented in the direction of progression 100 of the vehicle 2 and for the Y-axis perpendicular to the X-axis, passing through the origin O (and through the spatial indexing marker 56).

A focus is next made on a zone of interest delimited by the transversal edges 58, 60 of two successive sleepers 62, 64 and the inner edges 66, 68 of the two rails 22A, 22B (of which the potential curvature may be neglected at this scale). On the track, this zone constitutes a quadrilateral which may be defined by the intersections A, B, C, D between the edges of sleepers 58, 60 and the inner edges 66, 68 of the two rails 22A, 22B. On the distorted bitmap image, the quadrilateral image is itself distorted, but nevertheless locatable by its summits. It then suffices to identify the coordinates of the summits in the distorted image, and to apply the necessary fix as a function of the angle δ to obtain the coordinates of the summits A, B, C, D in the locating reference system.

In practice, the contrast of the images is not always sufficient to make it possible to determine, on the distorted bitmap image, the edges of the sleepers and the rail in direct proximity to the intersection points A, B, C, D. According to an alternative, it is thus preferred to define the zone of interest as a quadrilateral delimited by the intersections A', B', C', D', between the neutral lines 162, 164 constructed for each of the sleepers 62, 64 and the neutral lines 122A, 122B constructed for each of the rails 22A, 22B. The neutral lines are constructed by processing the images over the whole of the inter-sleeper space.

A focus is also made on the identification of potential obstacles in the quadrangular zone of interest <A, B, C, D> or <A', B', C', D'>. The existence or the absence of such obstacles makes it possible to qualify the zone of interest as a potential intervention zone (authorised zone) or a potential exclusion zone (prohibited zone). Independently of the detection of obstacles, the dimensions of the zone of interest may be used to qualify the zone of interest as a potential intervention zone (if the inter-sleeper space is sufficient to enable later intervention) or a prohibited zone.

The above operations (calculation of the angle δ, locating the spatial indexing marker 56 and calculation of its distance to the reference line 122A, locating the quadrilateral of the points of interest <A, B, C, D> or <A', B', C', D'> and calculation of their coordinates in the locating reference system O, x, y defined by the spatial indexing marker 56 and the reference line 122A, locating potential obstacles) are carried out cyclically for each inter-sleeper space, and initiated either by the odometer 28, or by the recognition of an edge of sleeper in the distorted bitmap image. In practice, an order number is assigned to each cycle and to each inter-sleeper space.

These processing operations are carried out by shape recognition algorithms. The human-machine interface 34 makes it possible if appropriate to invalidate them (if it is considered by default that the automatic recognition is valid) or to validate them (at least in learning mode, as long as the level of confidence on the shape recognition is insufficient). To this end, an operator can view the distorted image which is displayed on the control screen 38 of the human-machine interface 34. The quadrilateral <A, B, C, D> or <A', B', C', D'> is materialised superimposed on the screen, for example by a quadrilateral in colour, and identified potential obstacles are if appropriate marked according to a predetermined visual convention (arrow, contour, etc.). It is possible to provide that if it is in validation mode, the operator clicks with a pointer in the zone of interest to confirm the status thereof. Conversely, it is possible to provide that if it is in service mode, the operator clicks with a pointer in the zones of interest to infirm the status thereof. Naturally, it is possible to provide a large number of alternatives to the interaction between the operator and the locating system 12, according to the desired ergonomics and objectives.

At the end of the locating procedure described previously, there is available for each inter-sleeper space of a locating, in a local reference system <O, x, y>, the coordinates of points of interest A, B, C, D or A', B', C', D', delimiting a zone of interest [A, B, C, D] or [A', B', C', D'], qualified as allowed or prohibited. It is also possible to have available other data such as an inter-sleeper line.

These data are transmitted to the control unit 42 of the transposition system 16, in order that it can benefit therefrom at the moment where, following the continuous advance of the railway intervention vehicle 3, the transposition system 16 is positioned at the height of a predetermined space located beforehand by the locating system 12. On account of the curvature of the railway track 22, the positioning of the shuttle 9 compared to a given inter-sleeper space, when the matrix camera 44A of the transposition system 16 is positioned above said inter-sleeper space, is different from the positioning taken previously by the chassis 4 of the locating system 12, when the linear camera 26 was positioned above the same inter-sleeper space.

The transposition system 16 aims to enable a transposition, that is to say a change of Cartesian reference system, between the coordinates determined by the locating system 12 in the locating reference system <O, x, y> linked to a given inter-sleeper space, into coordinates that can be used at the level of the transposition system 16, notably for the command of the set of one or more tools 11.

For this purpose, the matrix camera 44A of the transposition system 16 is arranged facing the reference rail 22A, and has a sufficient width of field to capture both the reference rail 22A and the spatial indexing marker 56, it being recalled that this has been chosen close to the reference rail 22A.

The transposition system 16 must firstly be able to determine which are the locating data attributable at a given instant to an inter-sleeper space viewed by the matrix camera 44A of the transposition system 16.

Yet, knowledge of the geometry of the intervention machine 1 may turn out to be insufficient to estimate even roughly the distance between the odometer 28 of the locating system 12 and the matrix camera 44A of the transposition system 16, in so far as the shuttle 9 is assumed moveable with respect to the main chassis 6 of the railway intervention vehicle 3. An additional measurement is thus called upon, which may be supplied by a position sensor of the shuttle 9 with respect to the main chassis 6, or by an optional odometer 70 integral with an undercarriage 10 of the shuttle 2.

The combined measurements of the position sensor of the shuttle 9 and the odometer 28 of the locating system 12, or alternatively the measurements of the odometer 70 of the transposition system 16 make it possible to determine, with sufficient level of confidence, which are the locating data attributable at a given instant to an inter-sleeper space viewed by the matrix camera 44A of the transposition system 16.

The transposition matrix camera 44A is connected to a transposition reference system fixed with respect to the shuttle 9. By processing the bitmap image of the transposition matrix camera 44, the transposition unit 42 identifies the reference rail 22A, constructs the neutral line 122A which constitutes the reference line, and determines its orientation in the bitmap image, which gives direct access to an angle γ of orientation of the locating reference system O, x, y with respect to the transposition reference system. The transposition unit 42 also identifies the spatial indexing marker 56 and constructs the projection of the spatial indexing marker 56 on the reference rail 22A perpendicularly to the latter, which defines the origin O of the locating reference system <O, x, y> and its coordinates in the transposition reference system. The transposition unit 42 may then transpose into the transposition reference system the coordinates of the points of interest A, B, C, D that the locating system 12 has transmitted thereto in the locating reference system <O, x, y>.

On this basis, it is possible to transmit to the controller 46 for commanding the set of one or more tools 11 the transposed coordinates of the zone of interest and its qualification (as potential intervention zone). The controller 46 then generates the commands which enable the set of one or more tools 11 to intervene or not in the zone of interest A, B, C, D thus delimited. If appropriate, there may exist one or more degrees of freedom of movement of the set of one or more tools 20 with respect to the transposition chassis 45 supporting the transposition camera(s) 44A, 44B. The command may comprise a rotation of the set of one or more tools 20 around an axis perpendicular to the reference plane, or a translation of the set of one or more tools 20 in a transversal direction, to optimise the positioning of the set of one or more tools 20 with respect to the inter-sleeper space. The command may also comprise a lifting or a lowering of the set of one or more tools 20 according to the qualification of the zone of interest, as possible intervention zone or as prohibited zone.

Naturally, the examples represented in the figures and discussed above are only given for illustrative and non-limiting purposes. It is explicitly provided that it is possible to combine between them the different embodiments illustrated so as to propose others thereof.

The reference line chosen during the locating phase is not necessarily the line on which is carried out the estimation of the angle δ. It is possible if appropriate to choose the neutral line 122B of the rail 22B for reference line, and measure the angle δ with respect to the rail 22A.

According to an alternative, the reference line constructed by the locating system 12 is virtual, in the sense where it is not linked to a specific rail 122A, 122B. It may be for example a median line 222 of the railway track constructed from the neutral lines 122A and 122B of the rails 22A, 22B of the railway track 22. One is thus freed of singularities, such as interruptions of one of the rails at the level of some track apparatus.

This median line may be constructed by processing the distorted bitmap image, by searching point by point in each measurement line of the linear camera 26 the middle of the segment delimited by the centres of the two rails 22A, 22B, or, preferably, by constructing firstly the neutral line 122A, 122B of each rail 22A, 22B, then the line situated at mid-distance from the neutral lines 122A, 122B.

In this hypothesis of a virtual reference line constructed and used by the locating system 12, the transposition system 16 must also be able to reconstruct the virtual reference line. For this purpose, the transposition system preferably comprises a second transposition matrix camera 44B arranged above and facing the second rail 22B.

The second transposition matrix camera 44B is fixed to the transposition chassis 45 of the shuttle 9 in such a way that the relative positioning of the two transposition matrix cameras 44A, 44B is known and calibrated. Although each transposition matrix camera 44A, 44B only has a reduced width of field only making it possible to view the rail 22A, 22B above which it is positioned, it is possible to determine the positioning of the median line 222 between the neutral lines 122A, 122B by determining the positioning of the neutral line 122A of the first rail 22A in the bitmap image of the first transposition camera 44A, by determining the positioning of the neutral line 122B of the second rail 22B in the bitmap image of the second transposition camera 44B and by calculating the centre of the segment of straight line between the two neutral lines 122A, 122B from these measurements and calibration data of the distance between the two transposition cameras 44A, 44B.

According to an alternative of the locating system 12, the latter comprises a second orientation matrix camera 54B fixed to the chassis 4 of the locating vehicle 4 and having a viewing direction perpendicular to the reference plane of the railway track 22, facing the other rail 22B. The second orientation matrix camera 54B may be used to give a second value of the angle δ, measured with respect to the second rail 22B. Different algorithms may be implemented to exploit these data. It is possible for example to assign a confident index to each bitmap image delivered by one or the other orientation matrix cameras, for example as a function of the contrast of the image, the presence or not of the rail in the image or any other criterion, all to retain, for each inter-sleeper space, the measurement of the angle δ having the best confident index. It is also possible to combine the measurements carried out to calculate an "average" angle δ. In so far as the distance between the two orientation matrix cameras 54A, 54B is known and calibrated, it is also possible to use these cameras to determine the virtual reference line 222 mentioned previously. Finally, it is possible to envisage two independent measurement and calculation tracks, one using the first orientation matrix camera 54A and the first transposition matrix camera 44A with respect to a first reference line 122A, and the other using the second orientation matrix camera 54B and the second transposition matrix camera 44B with respect to a first reference line 122B. If appropriate, it is also possible to provide two odometers at the level of the surveillance system, one for each rail 22A, 22B, and each dedicated to one of the two measurement and calculation tracks.

In the locating phase, the identification of points of interest is not limited to the identification of the summits A, B, C, D or A', B', C', D' of a quadrilateral of potential intervention. Other types of points of interest may be identified, for example the coordinates of centres of screw heads to screw down or to change. An intervention zone is not necessarily a quadrilateral, but may be any polygon. It is also possible to seek to identify—instead of or in addition to the points of interest A, B, C, D—lines of interest, for example the straight lines constituting the neutral lines 162, 164 of the sleepers 62, 64, each situated at the corresponding centre of the sleepers 62, 64, or the straight line 163 constituting the inter-sleeper line, which is the axis of symmetry for the preceding straight lines 162, 164, situated at mid-distance between two sleepers 62, 64. In the local reference system <O, x, y> the coordinates of such straight lines may for example be those of two points belonging thereto, or the coordinates of a point of the line and of an angle.

Although the preceding description has focused on the inter-sleeper space, it is also possible to analyse with the locating system the portions of track comprising the sleepers, notably to detect therein points of interest requiring intervention.

The processing of data of the odometer 28, the linear camera 26 and the orientation device 52 by the locating system 12 is done in real time, or very slightly delayed, so as to be able to be used by the transposition system 16 belonging to the same continually advancing intervention machine 10. The distance between the locating system 12, situated in a front zone 14 of the locating vehicle 2 in the direction of progression 100 on the one hand, and the transposition system 16, situated at a distance and towards the rear of the vehicle, on the other hand, is benefited from notably to enable an operator to validate or invalidate the points of interest A, B, C, D or their qualification.

Alternatively, it is possible to advance the intervention machine 10 in a direction for locating, then to make it turn back in order, during a second pass, to carry out the transposition and the command of the set of one or more tools. During the transposition, the vehicle may advance in the oppose sense of the direction of advance during locating, or in the same direction.

The railway intervention machine 10 of which it is question may be constituted of one or more vehicles articulated between them. If appropriate, thus, the locating system 12, the transposition system 16 and the set of one or more tools 11 may be on a single and same vehicle. According to another embodiment, the locating system 12 may be mounted on a chariot running on the track and articulated at the front by a rolling unit bearing the transposition system 16 and the set of one or more tools 11.

It is also possible to envisage that the locating system 12 is mounted on an autonomous locating vehicle independent of the intervention machine 10 bearing the set of one or more tools 11. In this latter hypothesis, it is advantageous to provide on the locating vehicle an absolute positioning unit, for example a GPS unit, to be able to allocate to each inter-sleeper space the coordinates in the absolute positioning reference system, the latter being sufficiently precise to discriminate two successive inter-sleeper spaces.

If appropriate, the set of one or more tools 20 may be fixed with respect to the main chassis 6 of the intervention vehicle 3. It is then possible to estimate roughly the positioning of the set of one or more tools 20 from the only data of the odometer 28 of the locating system 12, to determine which are, at a given instant, locating data relevant for the transposition.

Although the description has more specifically focused on the use of the transposition procedure for the command of an intervention tool, the transposition may also be benefited from to operate a precise auscultation of the track by means of an auscultation instrument borne by a chassis remote from the locating chassis.

The human-machine interface 34 may be remote with respect to the vehicle 10, for example situated in a remote control post.

The invention claimed is:

1. A method of locating a railway track, carried out by a railway locating system progressing on the railway track in a direction of progression, the method comprising the following actions:
   repeatedly acquiring over time, with a linear camera of the railway locating system pointing at the railway track, a set of successive instantaneous linear optical data along an instantaneous measurement line;
   repeatedly acquiring over time, with an orientation device of the railway locating system, a set of successive orientation data of the railway locating system with respect to a reference line of the railway track;

by processing at least the set of successive instantaneous linear optical data, constructing a potentially distorted bitmap image of a zone of a surface of the railway track;

identifying points or lines of interest in the potentially distorted bitmap image; and determining rectified coordinates of the points or lines of interest, as a function of potentially distorted coordinates of the points or lines of interest in a reference system of the potentially distorted bitmap image and the set of successive orientation data.

2. The method of claim 1, wherein to acquire over time the set of successive orientation data, a first feeler of the orientation device detects an orientation of the locating system with respect to a first rail of the railway track, constituting a first orientation rail.

3. The method of claim 1, wherein to acquire over time the set of successive orientation data, a first orientation matrix camera of the orientation device, arranged facing a first rail of the railway track constituting a first orientation rail, takes shots processed by the orientation device to detect therein an orientation of the first orientation rail with respect to a target of the first orientation matrix camera.

4. The method of claim 1, wherein the locating system detects zones of the surface of the railway track comprising sleepers and inter-sleeper zones of the surface of the track, the orientation device only delivering the set of successive orientation data once for each of the inter-sleeper zones.

5. The method of claim 1, wherein the reference line is a neutral line of one rail of the railway track, or a line constructed from neutral lines of two rails of the railway track.

6. The method of claim 1, wherein the set of successive orientation data is used to construct the reference line from neutral lines of two rails of the railway track.

7. The method of claim 1, wherein the points or lines of interest constitute boundaries of a zone of interest.

8. The method of claim 1, further comprising reproduction of the bitmap image on a viewing screen of the locating system.

9. The method of claim 8, further comprising a visual identification on the viewing screen of the points or lines of interest.

10. The method of claim 2, wherein a second feeler of the orientation device detects an orientation of the locating system with respect to a second rail of the railway track, constituting a second orientation rail.

11. The method of claim 3, wherein a second orientation matrix camera arranged facing a second rail of the railway track, constituting a second orientation rail, takes shots and processing the shots, processed by the orientation device to detect therein an orientation of the second orientation rail with respect to a target of the second orientation matrix camera.

12. A method of locating a railway track, carried out by a railway locating system progressing on the railway track in a direction of progression, the method comprising the following actions:

repeatedly acquiring, with a linear camera of the railway locating system pointing at the railway track, instantaneous linear optical data along an instantaneous measurement line;

repeatedly acquiring, with one or more odometer(s) of the railway locating system, progression data of the railway locating system on the railway track in the direction of progression;

repeatedly acquiring, with an orientation device of the railway locating system, orientation data of the railway locating system with respect to a reference line of the railway track;

by processing at least the instantaneous linear optical data, constructing a potentially distorted bitmap image of a zone of a surface of the railway track;

identifying points or lines of interest in the potentially distorted bitmap image;

determining rectified coordinates of the points or lines of interest, as a function of potentially distorted coordinates of the points or lines of interest in a reference system of the potentially distorted bitmap image and orientation data;

reproducing the bitmap image on a viewing screen of the locating system;

by processing the potentially distorted bitmap image, identifying, in the potentially distorted bitmap image, at least one spatial indexing marker of a predetermined signature;

by processing the progression data and the orientation data, determining a curvilinear abscissa of the spatial indexing marker and a positioning of the spatial indexing marker relative to the reference line of the railway track;

wherein the rectified coordinates of the points or lines of interest are determined in a local two-dimensional locating reference system linked to the spatial indexing marker and the reference line; and a validation or an invalidation of some at least of the points or lines of interest or a zone of interest or a qualification of the zone of interest as a possible intervention or prohibited zone, following an input on a human-machine input interface.

13. The method of claim 12, wherein the reference line is a neutral line of one rail of the railway track, or a line constructed from neutral lines of the rail of the railway track.

14. The method of claim 12, wherein the points or lines of interest constitute boundaries of a zone of interest.

15. The method of claim 12, further comprising visual identification on the viewing screen of the points or lines of interest.

16. The method of claim 12, wherein a second orientation matrix camera arranged facing a second rail of the railway track, constituting a second orientation rail, takes shots and processing the shots, processed by the orientation device to detect therein an orientation of the second orientation rail with respect to a target of the second orientation matrix camera.

* * * * *